April 7, 1942.    E. E. STIMSON    2,279,147

NESTING DEVICE

Filed Jan. 27, 1939    2 Sheets-Sheet 1

INVENTOR.
EDGAR E. STIMSON
BY Flournoy Corey
ATTORNEY.

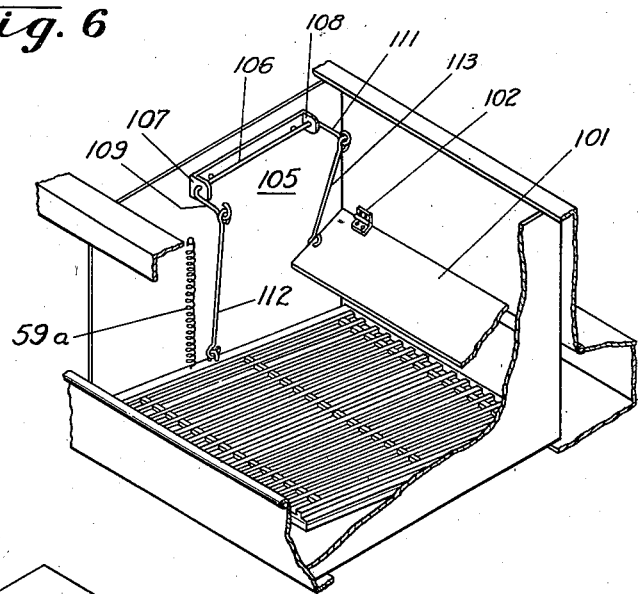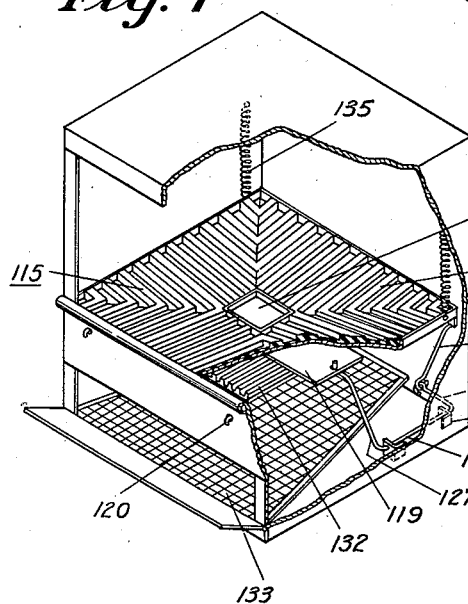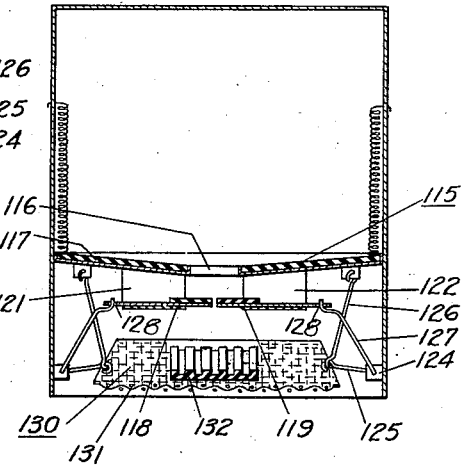

Patented Apr. 7, 1942

2,279,147

UNITED STATES PATENT OFFICE 2,279,147

NESTING DEVICE

Edgar E. Stimson, Malcom, Iowa

Application January 27, 1939, Serial No. 253,049

4 Claims. (Cl. 119—48)

This invention relates to poultry nesting devices.

Laying nests ordinarily used by poultry raisers have numerous, plainly apparent faults or shortcomings which it is an object of my invention to eliminate.

Most poultry appear to prefer to lay in nests already having eggs in them. Of course each time a fowl enters a nest she carries dirt into the nest on her feet. This dirt is generally transferred to the eggs. The longer eggs remain in the nest the more dirt they collect. It is a well known fact that dirty eggs do not bring as high a price on the market as clean eggs.

Since it is apparently a considerable task to wash individual eggs and also since washed eggs do not have the keeping qualities of unwashed eggs, it is therefore an object of my invention to provide a nesting device in which the egg is removed from the nest as soon as the fowl leaves.

It is another object of my invention to provide a device in which dirt and droppings may be collected where they will not come into contact with the eggs.

It is another object of my invention to provide such a device which will be simple in construction and which may be manufactured inexpensively.

It is a further object of my invention to provide a device which will aid in keeping such nests in a clean condition and further, means which will help in the elimination of parasites.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims, without departing from the spirit of the invention.

Figure 1:
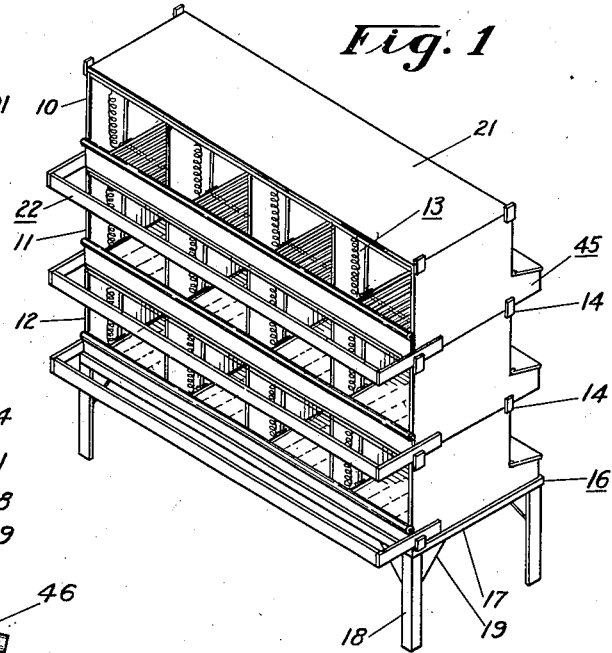

In said drawings:

In Figure 1, I have illustrated a view in perspective of a plurality of nests constructed in accordance with one embodiment of my invention.

Figure 2:
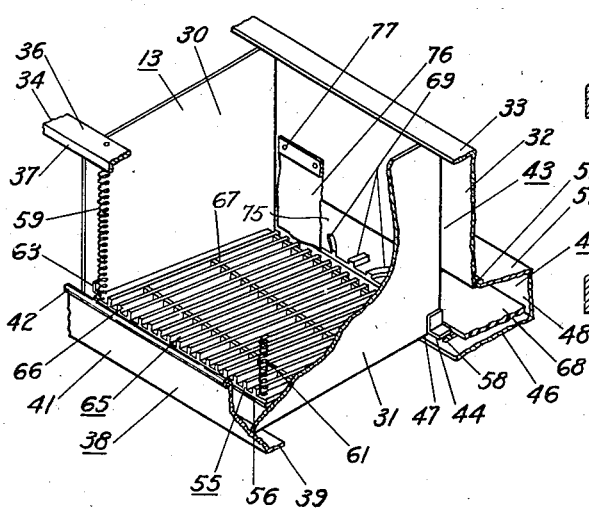

In Figure 2, I have illustrated in perspective a single nest constructed in accordance with one embodiment of my invention, and partly broken away to illustrate the inner construction.

Figure 3:
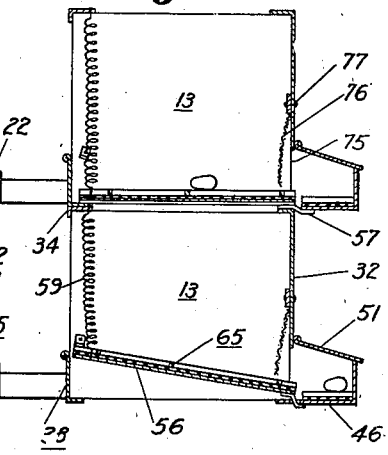

In Figure 3, I have shown a pair of nests in section as constructed in accordance with one embodiment of my invention, and illustrating the method of supporting one upon the other.

Figure 4:
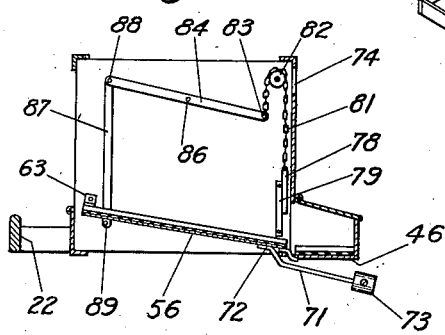

In Figure 4 is illustrated a sectional view of a nest constructed in accordance with another embodiment of my invention.

Figure 5:
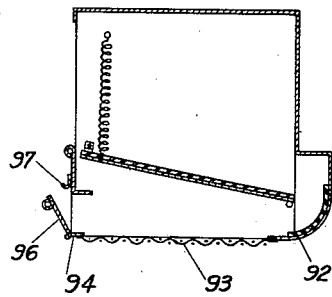

In Figure 5 I have shown a view in section of a nesting device constructed in accordance with still another embodiment of my invention.

In Figure 6, I have shown in perspective a device constructed in accordance with one embodiment of my invention and broken away to show the inner construction.

In Figure 7 is illustrated still another modification of my invention, and

In Figure 8 is shown a view in section of the device shown in perspective in Figure 7.

Referring now to the drawings, and to Figure 1 in particular; although it will be quite apparent from an examination of the following specification that nests may be constructed in accordance with my invention as individual units 13, it is preferable that they be constructed in groups of several nests as shown. Each group or unit 10, 11, and 12 is illustrated as having four nests each, each unit adapted to rest one upon the next lower unit and to be held in proper position above the lower units by means of small guide members 14 fastened at the ends of the units near the adjoining edges. The lowermost unit shown at 12 is adapted to rest upon a framework 16 to support it some distance above the ground. This framework may be of angle iron or wood construction, as desired. The framework 16 is illustrated as constructed of an angle iron top frame portion 17 having legs 18 at each corner thereof braced by means of triangular bracing members 19.

The top group of nests 10 is provided with a roof member 21. Each group of nests has a roost 22 supported at and spaced from the front of each group and has an egg storage receptacle extending rearwardly from each nest, as indicated generally at 45.

An individual nest is shown in detail in Figure 2 and consists of or includes end walls 30 and 31, and a back wall 32 having an opening in the lower part thereof and having its upper edge bent forward, as indicated at 33, both to reinforce the back wall and to act as a surface upon which to support another nest.

A reinforcing strip 34 is fastened to the side panels at the upper front corners thereof and is bent to form a top ledge 36 and a front surface 37 extending downwardly for a short distance from the top corner. A lower front member 38 is II broken or bent over to form an angle one side of which extends rearwardly as indicated at 39 to form a reinforcing and supporting surface upon which the floor of the nest may be supported.

This member 38 is preferably extended upwardly along the bottom front edge of each nest, as shown at 41, to a point approximately 2½ inches to 3 inches above the floor line of the nest and is rolled at its upper edge 42 to permit hens to step upon and grip that edge while entering or leaving the nest. The end members 30 and 31 may be held or fastened to the other portions of the structure by means such as illustrated generally at 43. The end members themselves may be bent over to form brackets which may be spot welded or otherwise fastened to the members 32, 34 and 38. Small individual angle members, as illustrated at 44, may be spot welded or otherwise fastened to each of the members being joined if desired.

An egg receptacle, indicated generally at 45, extends rearwardly from the lower portion of each nest. This receptacle preferably includes a bottom plate 46 attached to the lower rear corners of the end plates 30 and 31 and as indicated at 47. This bottom plate is preferably bent up at its rear end, as at 48, to form a rear wall. A lid 51 hinged as at 52 to the rear wall 32 is adapted to rest upon the upper edge of the wall 48 of the egg receptacle.

A hinged floor within each nest, as indicated generally at 55, may include a floor member 56 hinged at its rear end. The hinging may be accomplished by means of small Z shaped wire members, indicated at 57 in Figure 3, which may be loosely engaged in openings 58 shown in Figure 2 in the floor 46 of the egg receptacle.

The floor 55 is supported in an inclined position by means of springs 59 and 61. These springs are attached to the floor 56 at its front corners, the other ends of the springs being supported from the top cross member 36. The springs are made with a sufficient tension to support the floor member in the inclined position except when a fowl enters the nest, at which time the weight of the fowl will cause the floor to assume a horizontal position and rest on the portion 39 of the lower front wall member. When the fowl leaves the nest, the springs cause the floor to assume its inclined position and permit the egg to roll off the floor into the egg receptacle 45 at the rear.

It is apparent that only the one fowl can possibly step on an egg to cause it to become dirty. It is then removed from any possible contact with other fowls entering the nest later.

The upward movement of the forward end of the floor may be limited by means such as small angle members attached to the side walls as indicated at 63.

As a protection to the eggs against injury from contact with the hard surface of the floor and also to protect the eggs from becoming dirty due to contact with dirt and droppings on the floor, I have provided my device with the pad or cushion member indicated generally at 65. This pad member is preferably of a material such as soft rubber or sponge rubber, and may be in the form of a thin sheet to cover the floor, having a plurality of ribs upstanding and formed of the same material. These ribs extend from the front to the rear edge of the floor and are preferably spaced approximately one-fourth of an inch apart so as to permit dirt tracked in to drop between the ribs and still support an egg upon the top edges of the ribs to keep it out of contact with dirt.

The ribs running from the front to the rear of the nest tend to guide the eggs in a straight line into the egg receptacle. This pad may be formed with several laterally extending ribs, as shown at 67, so as to prevent dirt from sliding down into the egg receptacle and to break the speed of an egg rolling down the inclined floor.

The pad 65 is of course made removable from the floor to permit its being cleaned. If desired, insect powder may be dusted over the pad before it is returned to the nest to help eliminate parasites which tend to multiply in dirty nests.

The floor of the egg receptacle 45 may, if desired, also be covered with a resilient pad 68 to help prevent injury to the eggs. The top surface of this pad may be provided with a number of diverging ribs, as sown at 69, to help to distribute the eggs over the entire egg receptacle so as to make use of the entire receptacle.

The opening 75, below the back wall of the nest, into the egg receptacle, is preferably covered by some means such as a canvas drop 76 fastened to the back wall by a strap and rivets or the like, as indicated at 77, to prevent or discourage fowls from disturbing the eggs in the egg receptacle.

As explained before, the nests may be made in individual units or in groups of several nests. If made in groups the members 32, 34, 38, 46 and 51 may be made the entire length of the group.

When several groups of nests are rested one upon the other, as indicated in Figure 1 and as shown partially in section in Figure 3, a very compact nesting unit is had. Such a unit will serve the requirements of a large number of hens and it becomes necessary to collect the eggs only at relatively long intervals. When the eggs are collected it is only necessary to raise the lid 51 at the rear of each group to remove all of the eggs without disturbing any fowls within the nests at the time.

In Figure 3 I have illustrated the position of the floor in the top nest in the position it takes when a fowl is in the nest. In the lower nest the floor is illustrated in the position it takes when the fowl leaves the nest, thus permitting an egg to roll back into the egg receptacle.

In Figure 4 I have illustrated a modified structure of my device utilizing a counterweight instead of the spring members. An arm 71 is attached, as at 72, near the lower rear edge of the floor 56. This arm member is formed so as to extend downwardly far enough to clear the bottom of the floor 46 of the egg receptacle. A weight 73 is attached near the outer end of the arm and is of a weight sufficient to over balance the weight of the floor and pad member and yet not so heavy as to prevent the floor from lowering to its horizontal position when a fowl enters the nest.

In using the construction shown in Figure 4 it will of course be necessary to supply an opening, as indicated at 74, in the rear wall of each nest to permit the arm 71 from the nest above to extend through the rear wall.

I have also shown in Figure 4 a modified form of a drop to cover the opening into the egg receptacle.

A vertically sliding door 78 is guided by members 79. The door is attached by means such as a chain 81 to the end 83 of a lever arm 84 after passing over a free running pulley 82. The arm 84 is pivotally mounted, as at 86, to the end wall of the nest. A link 87 connects the free end 88 of the lever arm and the movable end of the floor of the nest, as shown at 89, where it is pivotally connected.

When a fowl enters the nest, the door will be dropped into the closed position. When the fowl leaves the nest, the door is raised to permit the egg to roll out of the nest.

The modified construction of my invention shown in Figure 5 has a receptacle of greater capacity and permits removal of the eggs from the front of the structure.

The nest is constructed substantially as the embodiments first described. The rear wall, however, may be extended to the rear and downwardly, as shown, to guide the eggs as at 91. The lower portion of this guide wall is curved forward again as at 92. A floor 93 of heavy wire screen of coarse mesh is attached to the wall 92 and to a cross member 94 at the front wall of the nest. A door 96 may be hinged to the cross member and be held in the closed position by a spring clip 97.

In operation, when a fowl leaves the nest, the egg rolls to the rear and drops against the curved rear wall at 92. From there it rolls onto the screen bottom 93. All dirt or droppings from above fall through the screen bottom.

It is preferable that the rear wall at 91 and 92 be covered with a rubber pad or the like to help prevent breakage of eggs.

The structure shown in Figure 6 illustrates a modified form of a drop to cover the opening into the egg receptacle.

A drop or door member 101 is hingedly attached, as at 102, to the back wall of the nest. An arrangement of levers and arms, indicated generally at 105, operatively connects the drop with the floor 56 so as to cause the drop 101 to rise to permit an egg to pass through when the floor is caused to tilt by the springs 59a. The lever arrangement includes a rod 106 mounted for partial rotation in brackets 107 and 108. The rod 106 is formed into U shape to provide arms 109 and 111, the outer ends of which pivotally connect to links 112 and 113 which in turn are pivotally connected to the tilting floor and the hinged back drop respectively.

In the embodiment of my invention shown in Figures 7 and 8 the egg is permitted to drop through an opening in the floor of the nest into an egg receptacle below as soon as the hen leaves the nest.

The floor of the nest, indicated generally at 115, is preferably slightly funnel-shaped, that is, the sides and bottom slope downwardly as well as inwardly so as to cause an egg to roll inwardly toward an opening 116 at the center thereof. The floor is preferably covered with ribbed rubber matting 117, as heretofore described.

A pair of horizontally placed and laterally sliding gate members 118 and 119 are supported immediately below the opening 116 by supporting bracket members 121 and 122. The brackets may be attached to the lower surface of the floor. An egg rolling through the opening 116 is deposited on the gate members which are also preferably covered with a resilient material such as the ribbed rubber matting.

When the hen leaves the nest, the gates 118 and 119 are caused to spread apart to drop the egg into an egg receptacle 130. This receptacle preferably comprises a tray shaped member of wire mesh construction 131 having a resilient pad 132 directly under the opening 116. The eggs may be removed from the tray through an opening 133 at the front and below the opening to the nest.

The floor is pivoted at the front corners, preferably on small wire hooks as shown at 120, so as to make the floor removable.

The rear of the floor is supported by springs 135 in an inclined position when there is no hen in the nest.

The gate members are operatively connected by a series of levers and links to the rear side of the floor. A rotatable rod 123 is mounted in brackets 124 on each end wall of the nest. One end of the rod is bent outwardly, as at 125, and pivotally connected by a link 126 to the movable rear edges of the floor. The other end of the rod is bent to form a lever 127, the outer end of which is substantially hook shaped and engages in an opening 128 in the outer end of one of the gate members.

The nest, if supplied in single units of one nest each, must of course include a top or roof portion which may be removable or attached permanently as desired.

I have provided a structure which should eliminate the majority of the causes of dirty eggs. A device constructed in accordance with my invention causes the eggs to be removed from the nest as soon as the weight of the hen is removed from the floor of the nest. Other fowls entering the nest later have no opportunity to come into contact with the eggs previously laid in the nest. Furthermore eggs resting on or rolling off of the floor are not permitted to come into contact with the dirt carried into the nest and left on the floor by the fowls. A given number of nests constructed in accordance with my invention will take care of a considerably larger flock of fowls than the ordinary type of nesting devices. Furthermore such a device permits or facilitates easy gathering of the eggs.

Although I have described several specific embodiments of my invention, it is apparent that modifications thereof may be made by those skilled in the art. Such modifications may be made without departing from the spirit and scope of my invention as set forth in the appended claims.

I claim as my invention:

1. In a poultry nesting device, a nesting compartment including end walls and a rear wall having an opening in the lower part thereof, a door for substantially closing the opening, an imperforate floor member pivotally mounted near the lower rear corner of the compartment, ears extending inwardly from an end wall and having openings therethrough, a shaft received for free rotation in the openings, lever arms extending inwardly from the shaft, a link pivotally connected to the floor and to one lever arm, a second link pivotally connected to the door and to the other lever arm, and spring means for normally holding the floor member in inclined position.

2. In a poultry nesting device, a nesting compartment including end walls, a substantially open front, a rear wall having an opening in the lower part and extending substantially the width thereof, an egg receptacle disposed to the rear of the opening, a floor member pivotally mounted near the lower rear corner of the compartment, a door within the opening and hinged along its upper edge, spring means for suspending the forward end of the floor, lever means, and link means operatively connecting the floor member, the lever means, and the door to cause the door to open inwardly as the floor member is permitted to rise.

3. In a poultry nesting device having a nesting compartment and an egg compartment at the rear thereof, a floor in the nesting compartment, means for pivotally supporting said floor near the rear of the nesting compartment, spring means for supporting the forward end of the floor, a door between the nesting compartment and the egg compartment, means for pivotally supporting said door near its upper edge, a lever arm pivotally mounted in the upper part of the nest, a link operatively connecting the lever arm and the floor, and a second link connected to the lever arm and to the door at a point below the pivotal supporting means.

4. In a poultry nesting device, a bank of nesting compartments including end panels for each nesting compartment, at least two runner strips for spacing the forward edges of the end panels and positioned substantially at the corners thereof and leaving the top and bottom of each compartment substantially open, the lower runner strip along the front of the compartments being formed to provide a protective edge, a rear wall extending the length of the nesting device but spaced from the lower rear corner thereof, an imperforate floor member in each nesting compartment pivotally mounted near the rear edge thereof, spring means for supporting the floor in position inclined downwardly toward the rear when the compartment is unoccupied, a door member in each compartment pivotally mounted near the lower edge of the rear wall, a lever arm pivotally mounted on an end panel of each compartment, a link connecting the floor and the lever arm, another link connecting the lever arm and the door, and an egg receptacle extending the length of the nesting device and disposed to the rear of and slightly below the floor member.

EDGAR E. STIMSON.